C. E. HARTHAN.
RELAY.
APPLICATION FILED MAY 19, 1915.

1,206,699.

Patented Nov. 28, 1916.

Inventor:
Charles E. Harthan,
by Allen B. Davis,
His Attorney.

UNITED STATES PATENT OFFICE.

CHARLES E. HARTHAN, OF LYNN, MASSACHUSETTS, ASSIGNOR TO GENERAL ELECTRIC COMPANY, A CORPORATION OF NEW YORK.

RELAY.

1,206,699.

Specification of Letters Patent.   Patented Nov. 28, 1916.

Application filed May 19, 1915.  Serial No. 29,059.

*To all whom it may concern:*

Be it known that I, CHARLES E. HARTHAN, a citizen of the United States, residing at Lynn, in the county of Essex, State of Massachusetts, have invented certain new and useful Improvements in Relays, of which the following is a specification.

My present invention relates to electromagnets and more particularly to electromagnets of the class commonly known as relays which are employed for opening and closing electrical circuits.

One of the objects of my invention is to provide an efficient and reliable construction for an electromagnet of this type.

A more specific object of my invention is to provide a satisfactory reverse current relay for use with an automobile starting system in which a small direct current dynamo electric machine is supplied with current from a storage battery and runs as a motor to start the engine of the automobile. After the engine has attained its normal speed the dynamo electric machine may be driven by the engine and run as a generator to charge the storage battery. In systems of this description it is desirable that the generator should be connected to the battery only when its voltage exceeds that of the battery. The function of my relay in this particular instance is to connect the generator to the battery as soon as it reaches a certain predetermined voltage and to cause it to be disconnected therefrom as soon as its voltage falls below that of the battery.

The features of my invention which I consider novel are pointed out with particularity in the appended claims.

The invention itself, however, with further objects and advantages will best be understood by reference to the following description taken in connection with the accompanying drawing in which—

Figure 1:
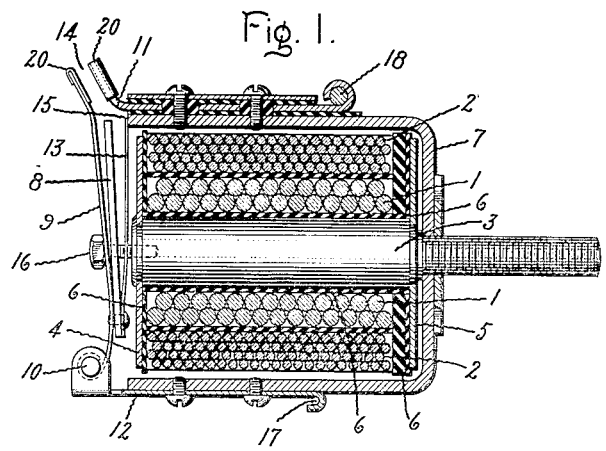
Figure 2:
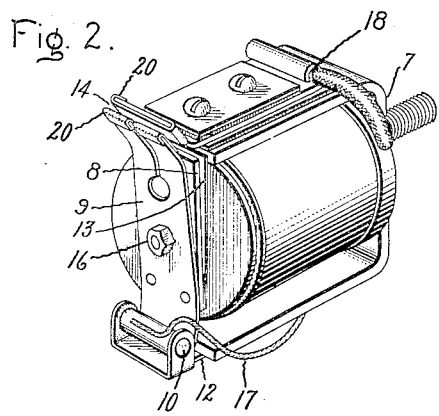

Figure 1 shows a cross sectional view of a relay constructed in accordance with my invention; Fig. 2 is a perspective view of the same; and Fig. 3 illustrates diagrammatically the electrical connections which may be employed with my relay in an automobile starting system.

As indicated in the drawing the magnet comprises a series winding 1 of heavy wire having a small number of turns and a shunt winding 2 of finer wire having a larger number of turns. The spool on which these windings are placed consists of a magnetic core 3 with a non-magnetic end member 4, and a second end member 5 which may be of magnetic or non-magnetic material as desired. The usual insulating members 6 are employed between the windings and between the windings and the spool. The electromagnet is surrounded on three sides by a U-shaped yoke 7 of magnetic material which provides a path of low reluctance for the flux set up by current in the windings. A movable armature 8 of magnetic material is mounted on the contact member 9 which is pivoted at 10 to one arm of the magnetic yoke. A second contact member 11 is rigidly secured to, but insulated from, the other arm of the yoke. Those contact members and the member 12 which secures the contact member 9 to the magnetic yoke are all preferably of non-magnetic material. A flat spring 13 of non-magnetic material fastened to the armature 8 normally holds the armature away from the magnet and keeps the two contact members separated at 14. This spring bears upon the end of the magnetic yoke at 15 and thus serves as a non-magnetic spacer between the armature and the yoke, thereby preventing "freezing" of the armature when it is attracted by the magnet. A stop 16 which may be adjustable, if desired, normally holds the contact member 9 and armature 8 in a position where the armature will be attracted as soon as the magnet exerts a predetermined pull on the armature. It will be noted that with the construction which I have described and illustrated the magnetic circuit which comprises the yoke 7 and the armature 8 has a small air gap at the point 15 and that the point 14 at which the contact members separate to open the circuit is adjacent this air gap. As a result the stray magnetic field across the air gap acts on any arc which may form when the circuit is opened and assists in extinguishing the same.

A flexible connector 17 may be soldered to member 12 and contact member 9 to provide good electrical conductivity between this contact member and the frame work of the magnet. One terminal of the series coil is connected to contact member 11 at 18 as indicated. One terminal of the shunt winding is also connected to the framework of the magnet at 19 as shown in Fig. 3. Contacts 20 of silver or other suitable metal may be provided on the ends of the contact members 9 and 11.

Figure 3:
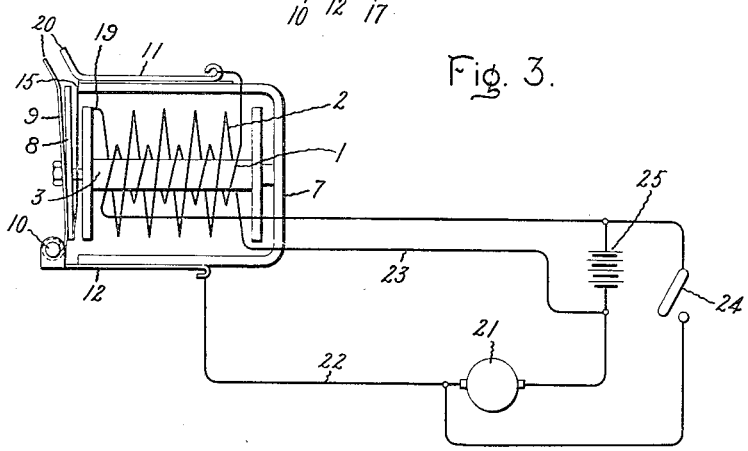

Having described the principal structural features of my invention I will now explain its operation when employed in an automobile starting system as indicated in Fig. 3. One terminal of the dynamo electric machine 21 is connected to the framework of the magnet by conductor 22 while the other terminal of the machine is connected by conductor 23 to the shunt winding of the magnet, thereby providing a permanently closed circuit from machine 21 through the shunt winding. When it is desired to start the engine of the automobile switch 24 is closed thereby connecting battery 25 to the machine 21 which then runs as a motor and starts the engine. As soon as the engine begins to run by its own power switch 24 is opened. If it is desired that the battery be charged the connection between the engine and the dynamo electric machine is retained whereby the latter becomes a generator. As soon as its voltage has reached a predetermined value the shunt winding 2 produces a sufficient pull in the magnet to attract the armature 8 and close the contacts at 14. This connects the battery to the generator through the series winding and as long as the battery is being charged the current through the series winding assists the shunt current in attracting the armature 8. As soon, however, as the voltage of battery 25 exceeds that of generator 21 current starts to flow in the reverse direction and the magnetization produced by the series winding opposes that produced by the shunt winding allowing the spring 13 to retract armature 8 and open the battery circuit.

While I have illustrated the application of my invention to an automobile starting system, it will be evident that it may equally well be used for other purposes and I do not wish to be limited to this particular application. It will also be apparent that many modifications may be made in the structural details of my device without departing from the scope of my invention.

What I claim as new and desire to secure by Letters Patent of the United States, is:—

1. The combination in an electromagnet of a core of magnetic material, windings surrounding said core, a U-shaped magnetic yoke surrounding three sides of said windings, a pivoted contact member carried by one arm of said magnetic yoke, an armature carried by said contact member so as to be attracted by the magnetic core and yoke when current flows through said windings and a spring for normally holding said armature in a retracted position and so positioned that it is interposed between the armature and the yoke when the armature is attracted.

2. The combination in an electromagnet of a core of magnetic material, windings surrounding said core, a U-shaped magnetic yoke surrounding three sides of said windings, a fixed contact member carried by one arm of said yoke, a pivoted contact member carried by the other arm of said yoke, an armature carried by said pivoted contact member so as to be attracted by the yoke when the latter is energized and a flat spring of non-magnetic material carried by said armature and bearing against the end of said yoke for normally holding said armature in a retracted position and for keeping the armature from contact with the yoke when attracted thereby.

3. The combination in an electromagnet of a magnetizing coil, a magnetic circuit of low reluctance surrounding said coil, having an air gap therein and contacts adapted to be made and broken by the action of the electromagnet, located adjacent to and above said air gap.

4. The combination in an electromagnet of a magnetizing winding, a magnetic yoke surrounding said winding on three sides, a movable armature of magnetic material adjacent the fourth side of said winding and forming a part of the magnetic circuit, an air gap in the magnetic circuit between said armature and said yoke and contacts, adapted to be made and broken by the movement of said armature located adjacent to and above said air gap.

5. The combination in an electromagnet of a magnetizing winding, a U-shaped magnetic yoke surrounding said winding on three sides, a fixed contact carried by one arm of said yoke, a coöperating movable contact carried by the other arm of the yoke, an armature so arranged as to be attracted by the magnetic yoke when the latter is magnetized and an air gap in the magnetic circuit between said armature and the end of said yoke, said air gap being located adjacent said contacts.

6. The combination in an electromagnet of a magnetizing winding, a U-shaped magnetic yoke surrounding said winding on three sides, a fixed contact carried by one arm of said yoke, a coöperating pivoted contact member carried by the other arm of said yoke, an armature carried by said pivoted contact member so as to be attracted by the magnetic yoke when the latter is magnetized, a spring for normally holding said armature in a retracted position and keeping said contacts separated and an air gap in the magnetic circuit between said armature and the end of said yoke, said air gap being located adjacent said contacts.

In witness whereof, I have hereunto set my hand this 15th day of May, 1915.

CHARLES E. HARTHAN.